(12) United States Patent
Hwang et al.

(10) Patent No.: US 7,368,157 B2
(45) Date of Patent: May 6, 2008

(54) INFORMATION STORAGE MEDIUM AND APPARATUS FOR RECORDING/REPRODUCING INFORMATION THEREON

(75) Inventors: In-oh Hwang, Seongnam-si (KR); Joo-ho Kim, Yongin-si (KR); Hyun-ki Kim, Hwaseong-si (KR); Nak-hyun Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 610 days.

(21) Appl. No.: 11/079,321

(22) Filed: Mar. 15, 2005

(65) Prior Publication Data
US 2005/0254407 A1 Nov. 17, 2005

(30) Foreign Application Priority Data
May 17, 2004 (KR) ............ 10-2004-0034906

(51) Int. Cl.
*B32B 3/02* (2006.01)
(52) U.S. Cl. ........... 428/64.1; 428/64.4; 428/64.5; 430/270.12
(58) Field of Classification Search ........ 428/64.1, 428/64.4, 64.5; 430/270.12
See application file for complete search history.

(56) References Cited

U.S. PATENT DOCUMENTS

| | | | | |
|---|---|---|---|---|
| 5,733,623 | A * | 3/1998 | Raychaudhuri et al. | 428/64.1 |
| 5,796,708 | A * | 8/1998 | Ohkawa et al. | 369/283 |
| 6,730,384 | B2 * | 5/2004 | Yamamoto et al. | 428/64.1 |
| 6,896,946 | B2 * | 5/2005 | Chen | 428/64.1 |
| 2003/0002428 | A1 | 1/2003 | Cheong et al. | |
| 2003/0202452 | A1 * | 10/2003 | Mishima et al. | 369/112.23 |
| 2003/0231577 | A1 * | 12/2003 | Mishima et al. | 369/283 |
| 2004/0027973 | A1 * | 2/2004 | Aoshima et al. | 369/121 |
| 2004/0152016 | A1 * | 8/2004 | Mishima et al. | 430/270.12 |

FOREIGN PATENT DOCUMENTS

JP    06-150418    5/1994

(Continued)

OTHER PUBLICATIONS

Office Action issued in Korean Pat. App. No. 2004-0034906 on Dec. 14, 2005.

PCT International Search Report dated Aug. 24, 2005, issued in corresponding PCT International Application No. PCT/KR2005/001439.

(Continued)

*Primary Examiner*—Elizabeth Mulvaney
(74) *Attorney, Agent, or Firm*—Stein, McEwen & Bui, LLP

(57) ABSTRACT

An information storage medium reduces low frequency noise, and an apparatus records and/or reproduces information thereon. The information storage medium includes a substrate; a recording layer formed on the substrate and including at least two materials in which the materials chemically react with each other due to an incident beam thereon having a write power and form a recording mark; and a super resolution reproduction layer formed on and/or under the recording layer and having a property in which optical characteristics of a partial area of a spot due to the incident beam are changed. The apparatus to record and/or reproduce information on the information storage medium includes a pickup unit having a light source, an objective lens to form a beam spot on the information storage medium, and a photodetector; a signal processor; and a controller.

74 Claims, 11 Drawing Sheets

FOREIGN PATENT DOCUMENTS

| | | |
|---|---|---|
| JP | 07-223372 | 8/1995 |
| JP | 2000-149348 | 5/2000 |
| JP | 2001-297482 | 10/2001 |
| KR | 2001-0055397 | 7/2001 |
| KR | 2001-81263 | 8/2001 |
| KR | 2003-0002590 | 1/2003 |

OTHER PUBLICATIONS

T. Kikukawa, et al. "Rigid Bubble Pit Formation and Huge Signal Enhancement in Super-Resolution Near-Field Structure Disk with Platinum-Oxide Layer," *Applied Physics Letters*, vol. 81, No. 25, pp. 4697-4699 (Dec. 16, 2002).

J. Tominaga, et al. "Ferroelectric Catastrophe: Beyond Nanometre-Scale Optical Resolution," *NANOTECHNOLOGY*, vol. 15, pp. 411-415 (Jan. 29, 2004).

* cited by examiner

INFORMATION STORAGE MEDIUM AND APPARATUS FOR RECORDING/REPRODUCING INFORMATION THEREON

CROSS-REFERENCE TO RELATED APPLICATION

This application claims the benefit of Korean Patent Application No. 2004-34906, filed on May 17, 2004 in the Korean Intellectual Property Office, the disclosure of which is incorporated herein in its entirety by reference.

BACKGROUND OF THE INVENTION

1. Field of the Invention

The present invention relates to an information storage medium on which information may be recorded/reproduced using a super resolution phenomenon and an apparatus for recording/reproducing information thereon, and more particularly, to an information storage medium to reduce reproduction low frequency noise and an apparatus to record and/or reproduce information thereon.

2. Description of the Related Art

An information storage medium is used in an optical pickup apparatus to record/reproduce information in a non-contact manner. The recording density of information needs to be increased with the development of industries. To this end, an information storage medium including a recording mark having a size that is smaller than a size formed by a resolving power ($\lambda/4NA$, where $\lambda$ is the wavelength of a laser beam and NA is a numerical aperture of an objective lens) of a laser beam. That is, an information storage medium on which information may be recorded/reproduced using a super resolution phenomenon is being studied. In particular, a super resolution optical disk using a metallic oxide layer and a phase variation layer is being studied with great interest.

As an example of the super resolution optical disk using the metallic oxide layer and the phase variation layer, T. Kikukawa et al. APPLIED PHYSICS LETTERS, Vol. 81, No. 25, pp. 4697-4699, (16 Dec. 2002) describes a super resolution optical disk having a $PtO_x$ super resolution reproduction layer, wherein x is a positive number, and an Ag—In—Sb—Te reproduction layer. In the example, the $PtO_x$ super resolution reproduction layer is decomposed into Pt particles and oxygen by the application of the write power, a recording mark is formed, and an electron field coupling (EFC) in the vicinity of the Pt particles is a mechanism for super resolution reproduction.

As another example of the super resolution optical disk using the metallic oxide layer and the phase variation layer, J. Tominaga et al. NANOTECHNOLOGY, Vol. 15, pp. 411-415, (29 Jan. 2004) have written a paper on a super resolution optical disk in which a phase variation layer actually shows a super resolution phenomenon. In the paper, in a Ge—Sb—Te or an Ag—In—Sb—Te phase variation material, one crystal phase is changed into another crystal phase at a predetermined temperature, some of the optical characteristics in a laser beam spot are changed, and thus, super resolution reproduction is possible.

Meanwhile, those examples show an information storage medium having a phase variation layer shown in FIG. 1. Referring to FIG. 1, the information storage medium comprises a substrate 11, a first dielectric layer 13, a metallic oxide layer 15, a second dielectric layer 17, a phase variation layer 19, a third dielectric layer 21, and a cover layer 23, which are sequentially formed on the substrate 11. In this case, an incident beam focused by an objective lens OL is transmitted into the cover layer 23.

$PtO_x$ may be used as a metallic oxide that comprises the metallic oxide layer 15. When $PtO_x$ is used as the metallic oxide, $PtO_x$ is decomposed into Pt particles and oxygen when information is recorded, and thus, a recording mark 20 having an elliptical bubble structure is formed.

The recording mark 20 has both ends rounded. Thus, it is difficult to precisely set a boundary between a portion in which the recording mark 20 is formed and a portion in which the recording mark 20 is not formed, and it is recognized that when using an information recording/reproducing apparatus, the size of the recording mark 20 is nonuniform. Therefore, when information is reproduced on the recording mark 20, the level of a reproduction signal is irregular, and low frequency noise increases in a frequency spectrum.

In addition, when the size of the recording mark 20 is determined using an edge detection method of the recording mark 20, the irregularity of the signal level causes a reduction in jitter of the reproduction signal. Here, jitter refers to the standard deviation of a reference clock versus the length of a mark. Accordingly, jitter having an effective quality cannot be obtained from the super resolution information storage medium having the above structure.

SUMMARY OF THE INVENTION

An aspect of the present invention provides an information storage medium to reduce low frequency noise and an apparatus to record and/or reproduce information thereon.

According to an aspect of the present invention, an information storage medium has a recording mark with a size that is smaller than a size formed by a resolving laser power of a beam incident from an apparatus to record/reproduce information on the information storage medium. The medium comprises a substrate; a recording layer formed on the substrate and comprising at least two materials in which the materials chemically react with each other due to an incident laser beam having a write power, form a recording mark; and a super resolution reproduction layer formed on and/or under the recording layer and having a property in which optical characteristics of a partial area on which the laser beam is incident are changed.

According to another aspect of the present invention, an information storage medium has a recording mark with a size that is smaller than a size formed by a resolving power of a laser beam incident from an apparatus to record/reproduce information on the information storage medium. The medium comprises a substrate; a super resolution reproduction layer formed on the substrate and having a property in which optical characteristics of a partial area of a spot on which the laser beam is incident are changed; and a recording layer formed on and/or under the super resolution reproduction layer and comprising at least two materials in which the materials chemically react with each other due to the incident laser beam having a write power, to form a recording mark.

According to an aspect of the present invention, the information storage medium further comprises a dielectric layer having a structure with at least one layer to control optical and/or thermal characteristics on the substrate, the dielectric layer comprising one material selected from the group consisting of an oxide, a nitride, a carbide, a sulfide, and a fluoride.

The recording layer may have a one layer structure in which two or more materials are mixed with each other or a structure in which a portion of the at least two materials is disposed on the one layer, and the other portions thereof are disposed on and/or under the one layer.

According to still another aspect of the present invention, an apparatus records and/or reproduces information on an information storage medium. The apparatus comprises a pickup unit having a light source to radiate a laser beam, an objective lens to focus the incident laser beam and form a laser beam spot on the information storage medium, and a photodetector to receive the laser beam reflected from the information storage medium; a signal processor processing a signal detected by the photodetector and calculating an information signal and an error signal; and a controller controlling a laser beam power output from the light source from the signal detected by the signal processor and driving the objective lens.

According to an aspect of the invention, an information storage medium reduces low frequency noise and an apparatus records and/or reproduces information thereon. The information storage medium includes a substrate; a recording layer formed on the substrate and comprising at least two materials in which the materials chemically react with each other due to an incident laser beam having a write power and form a recording mark; and a super resolution reproduction layer formed on and/or under the recording layer and having a property in which optical characteristics of a partial area of a spot formed by the incident laser beam are changed.

According to an aspect of the invention, the apparatus to record and/or reproduce information on the information storage medium includes a pickup unit having a light source to radiate a laser beam, an objective lens to focus the incident beam and to form a laser beam spot on the information storage medium, and a photodetector to receive the laser beam reflected from the information storage medium; a signal processor processing a signal detected by the photodetector and calculating an information signal and an error signal; and a controller controlling a laser beam power output from the light source according to the signal detected by the signal processor and driving the objective lens.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
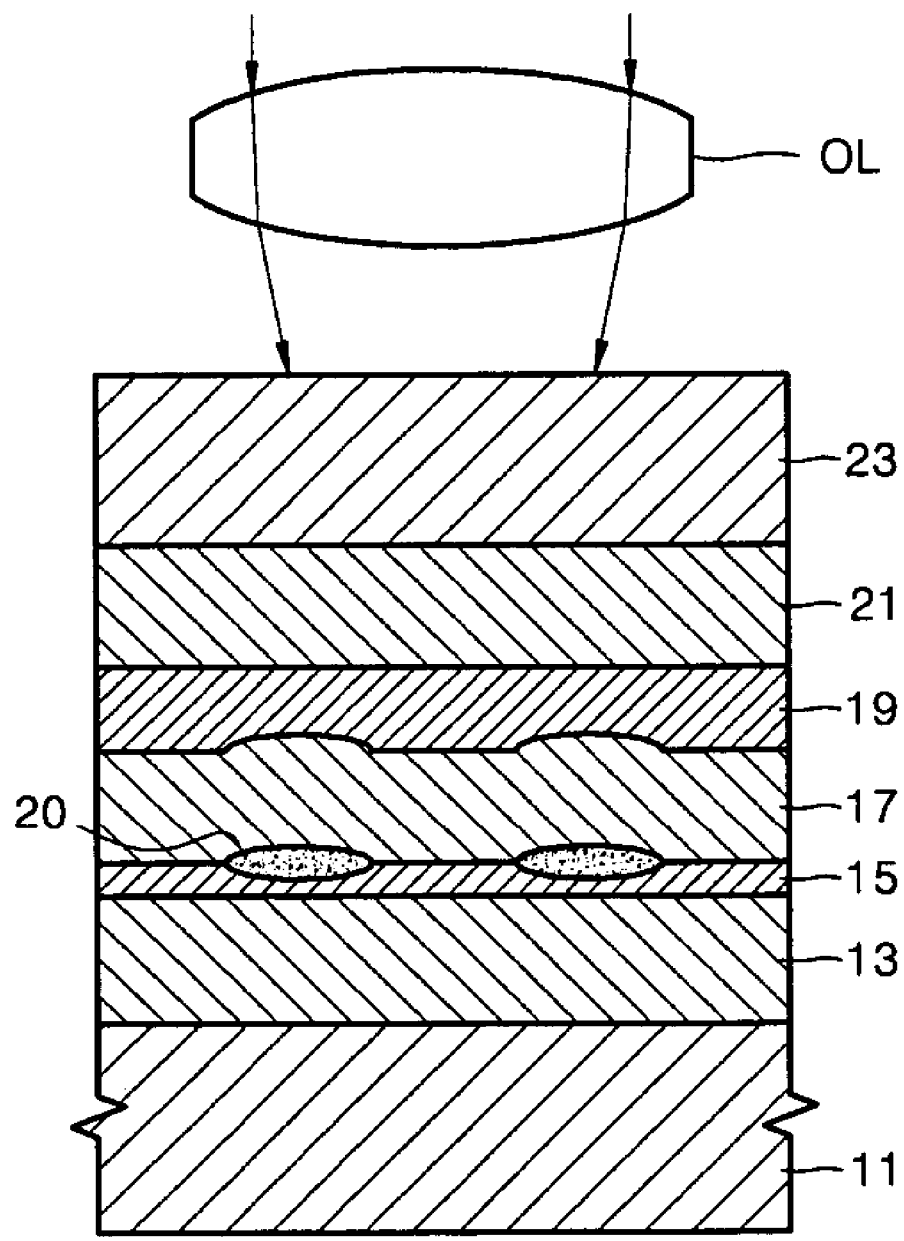
FIG. 1 is a cross-sectional view schematically showing a conventional phase variation super resolution information storage medium using a metallic oxide recording layer.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
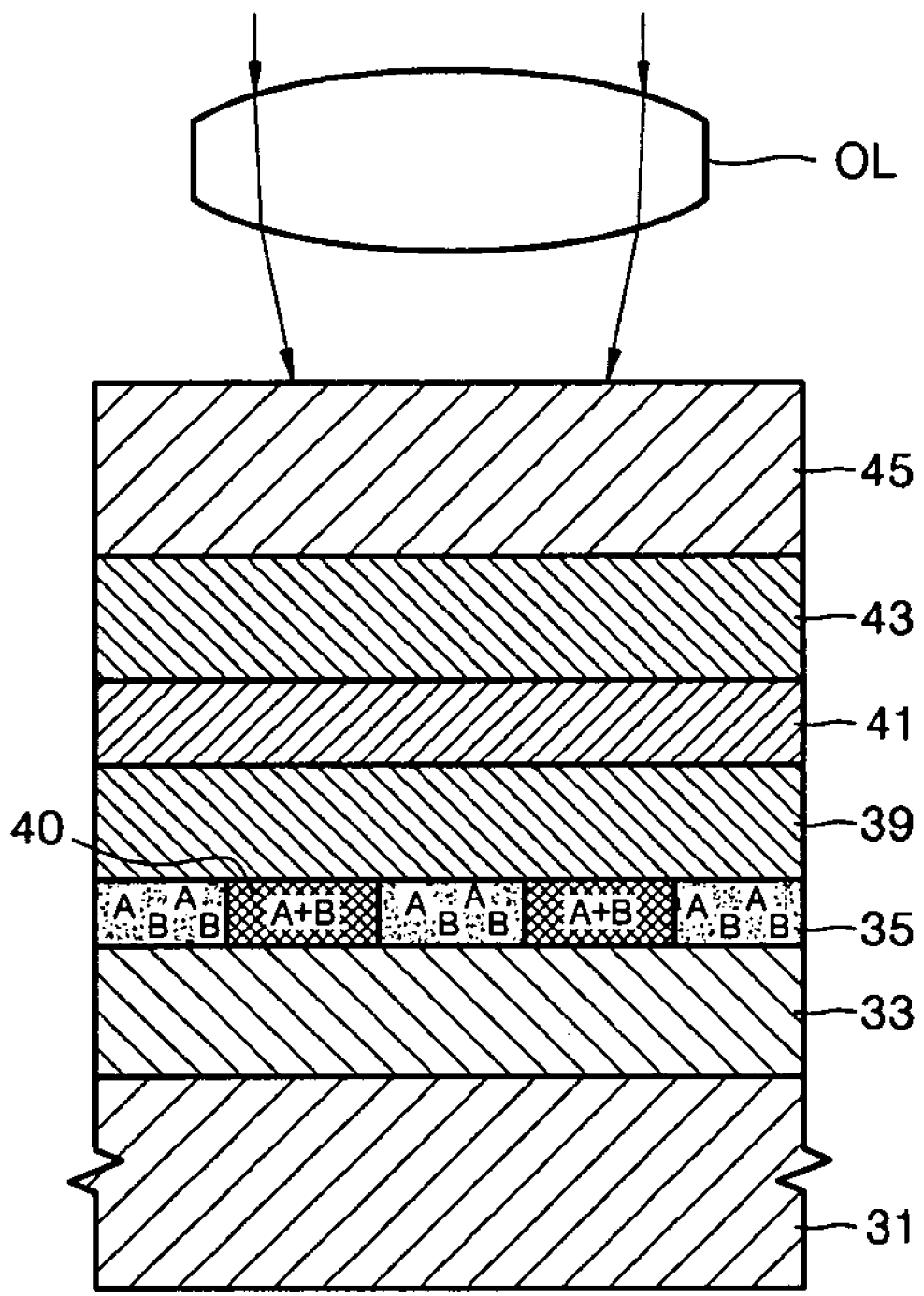
FIG. 2 is a cross-sectional view schematically showing an information storage medium according to an embodiment of the present invention.

Referring to FIG. 2, an information storage medium according to an embodiment of the present invention includes a substrate 31, a first dielectric layer 33, a recording layer 35, a second dielectric layer 39, a super resolution reproduction layer 41, a third dielectric layer 43, and a cover layer 45, which are sequentially formed on the substrate 31. Here, laser beams used in recording/reproducing information are focused by an objective lens OL (such as the objective lens 217 shown in FIG. 12), transmitted into the cover layer 45, and are incident on the layers below in accordance with the focusing of the objective lens.

While not required, the substrate 31 may be made of one or more materials including polycarbonate, polymethyl methacrylate (PMMA), amorphous polyolefin (APO), a glass material or combinations thereof. A surface of the substrate 31, that is, a surface opposite to the first dielectric layer 33 may be coated with a reflective layer (not shown) to reflect an incident beam.

The first through third dielectric layers 33, 39, and 43 are used to control optical and/or thermal characteristics. The cover layer 45 covers the layers formed on the substrate 31 inclusive of the recording layer 35 and the super resolution reproduction layer 41. Here, the first through third dielectric layers 33, 39, and/or 43 and the cover layer 45 are not essential elements of the present invention, and even when these layers are not present, information can be reproduced.

Each of the first through third dielectric layers 33, 39, and 43 controls optical and/or thermal characteristics and may be made of one material of oxide, nitride, carbide, sulfide, or fluoride according to aspects of the invention. That is, each of the first through third dielectric layers 33, 39, and 43 may be made of one or more materials including $SiO_x$, $Mg_x$, $AlO_x$, $TiO_x$, $VO_x$, $CrO_x$, $NiO_x$, $ZrO_x$, $GeO_x$, $ZnO_x$, $SiN_x$, $AlN_x$, $TiN_x$, $ZrN_x$, $GeN_x$, $SiC$, $ZnS$, $ZnS$-$SiO_2$, and $MgF_2$, where x is a positive integer.

The recording layer 35 has a structure in which the cross-section of the recording mark 40 recorded by an incident laser beam with a predetermined write power has a rectangular shape or a similar shape. Here, the recording mark 40 includes a mark having a size that is smaller than a size formed by a resolving power of an optical pickup used in reproduction. In this case, to reproduce repetitive information using a super resolution phenomenon, a chemical reaction temperature Tw of the recording layer 35 is higher than a temperature Tr at which a super resolution phenomenon occurs in the super resolution reproduction layer 41. Thus, to form the recording mark 40, the recording layer 35 has a one-layer structure in which at least two different kinds of materials (for example, two materials A and B shown in FIG. 2) that have different physical properties and chemically react with each other at a predetermined temperature.

Before chemical reaction between the materials A and B, the recording layer 35 has a condition in which the materials A and B are mixed with (but not reacted with) each other. Meanwhile, when a recording beam of a predetermined power is irradiated on the recording layer 35, the materials A and B chemically react with each other in a portion in which a light spot is formed by the recording beam of the predetermined power. The chemical reaction results in a compound A+B having a property different from that of the condition in which the materials A and B are mixed with each other. The compound A+B is used in forming the recording mark 40, and the recording mark 40 has a reflectance different from a reflectance of other areas having the unreacted A and B materials.

While not limited thereto, the material A may include tungsten (W) and the material B may include silicon (Si). These materials are selected in consideration of the fact that, when a Ge—Sb—Te material is used to form a phase variation layer in layer 41 that will be described later, a temperature at which a super resolution phenomenon occurs during reproduction is about 350° C., and information should be recorded at a temperature that is higher than the reproduction temperature. In other words, since the reaction temperature of a W—Si alloy is about 600° C., a reproduction power does not have an effect on the W—Si alloy.

When the materials W and Si are selected in this way, the recording layer 35 may be formed by mixing the materials W and Si so that the atom number ratio of W to Si is about 1:2 in consideration of the atomic weight and the density difference between the materials. In this case, if chemical reaction occurs, a predetermined area of the recording layer 35 formed due to the beam of the write power is a $WSi_2$ compound. Here, the atom number ratio of W to Si has been just exemplified, but is not limited to the atomic number ratio of this example.

In addition, the materials W and Si have been just exemplified as constituents of a material for the recording layer 35, but the recording layer may include two or more materials that chemically react at a temperature that is higher than the reproduction temperature within the range in which information recording may be performed using a laser beam, for example, at least two or more materials of V, Cr, Co, Ni, Cu, Ge, Se, Nb, Mo, Ag, Sn, Sb, Te, Ti, Zr, W, and lanthanide (Ln) may be utilized.

As described above, the recording layer 35 has a structure in which the recording mark 40 is formed according to chemical reaction in the material used in forming the recording layer 35. Thus, unlike the recording mark 20, shown in FIG. 1, which uses a volume expansion method, the cross-section of the recording layer 35, shown in FIG. 2, has a rectangular shape or a similar shape.

The super resolution reproduction layer 41 is made of a phase variation material having a property in which optical characteristics of a partial area of a spot on which the laser beam is incident are changed. That is, the super resolution reproduction layer 41 may be made of a Chalcogenide phase variation material which is a material including at least one material selected from the group consisting of S, Se, and Te.

While not limited thereto, examples of the super resolution reproduction layer 41 include a compound, such as Se—S, Se—Te, S—Te, P—S, P—Te, P—Se, As—S, As—Se, As—Te, Sb—S, Sb—Se, Sb—Te, Si—S, Si—Se, Si—Te, Ge—S, Ge—Se, Ge—Te, Sn—S, Sn—Se, Sn—Te, Ag—S, Ag—Se, Ag—Te, Al—S, Al—Se, Al—Te, Ga—S, Ga—Se, Ga—Te, In—S, In—Se, and In—Te, or at least one compound selected from compounds formed by adding at least one or more other elements to the Chalcogenide phase variation materials.

According to an aspect of the invention, the super resolution reproduction layer 41 is made of a phase variation material such as Ge—Sb—Te or Ag—In—Sb—Te.

Thus, in the super resolution reproduction layer 41, one crystal phase is changed into another crystal phase at a predetermined temperature, and optical characteristics of a super resolution area (part of a laser beam spot which is a portion of a predetermined diameter from the beam spot) are changed. Thus, information is reproduced on the recording mark 40 having a size that is smaller than a size formed by a resolving power of the laser beam.

The information storage medium having the above structure shown in FIG. 2 comprises the recording layer 35 having a one layer structure in which two or more materials are mixed with each other such that a recording mark having a rectangular shape or a cross-section structure similar to the rectangular shape is formed. Thus, when a signal is read using an edge detection method of the recording mark, the size of the recorded signal may be detected precisely such that low frequency noise that affects jitter may be reduced.

Figure 3:
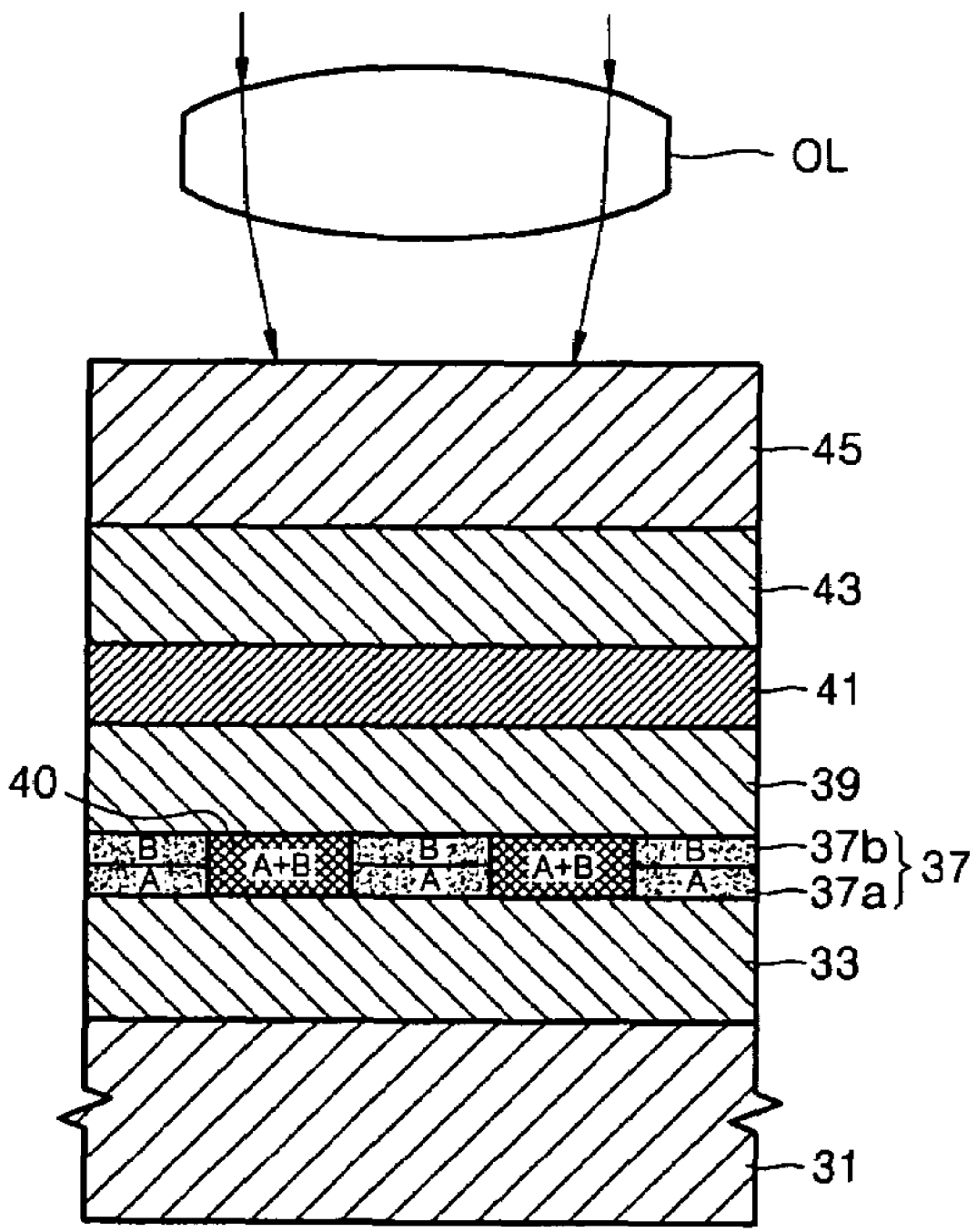
FIG. 3 is a cross-sectional view schematically showing an information storage medium according to an embodiment of the present invention.

Referring to FIG. 3, an information storage medium according to another embodiment of the present invention includes a substrate 31, a first dielectric layer 33, a recording layer 37, a second dielectric layer 39, a super resolution reproduction layer 41, a third dielectric layer 43, and a cover layer 45, which are sequentially formed on the substrate 31. The information storage media according to the embodiment shown in FIG. 3 is different from the embodiment shown in FIG. 2 with respect to the structure of the recording layer 37. Thus, the recording layer 37 will now be described in detail and descriptions of the substrate 31, the first through third dielectric layers 33, 39, and 43, the super resolution reproduction layer 41, and the cover layer 45, which have the same names and the same reference numerals, will be omitted.

The recording layer 37 shown in FIG. 3 comprises at least two materials A, B and has a multi-layer structure in which a portion of the materials A and B is disposed on the uppermost layer 37b and the other portions of the material A, B are disposed on and/or under the lowermost layer 37a. As shown, material A is in the lower layer 37a, and material B is in the upper layer 37b. Referring to FIG. 3, when two materials A and B are selected as a material for the recording layer 37, before a mark is recorded, the recording layer 37 comprises first and second recording layers 37a and 37b.

In this case, the first recording layer 37a comprises the material A, for example, tungsten (W), and the second recording layer 37b comprises the material B, for example, silicon (Si). In addition, the first recording layer 37a may comprise Si, and the second recording layer 37b may comprise W.

If a recording beam of a predetermined power is irradiated on the recording layer 37 having the above structure, the materials A and B separately disposed on the first and second recording layers 37a and 37b chemically react with each other in a portion in which a light spot is formed by the recording beam of the predetermined power, thus forming the recording mark 40 made of the compound A+B. In this way, the recording mark 40 is substantially the same as the recording mark 40 according to the embodiment shown in FIG. 2.

Figure 11:
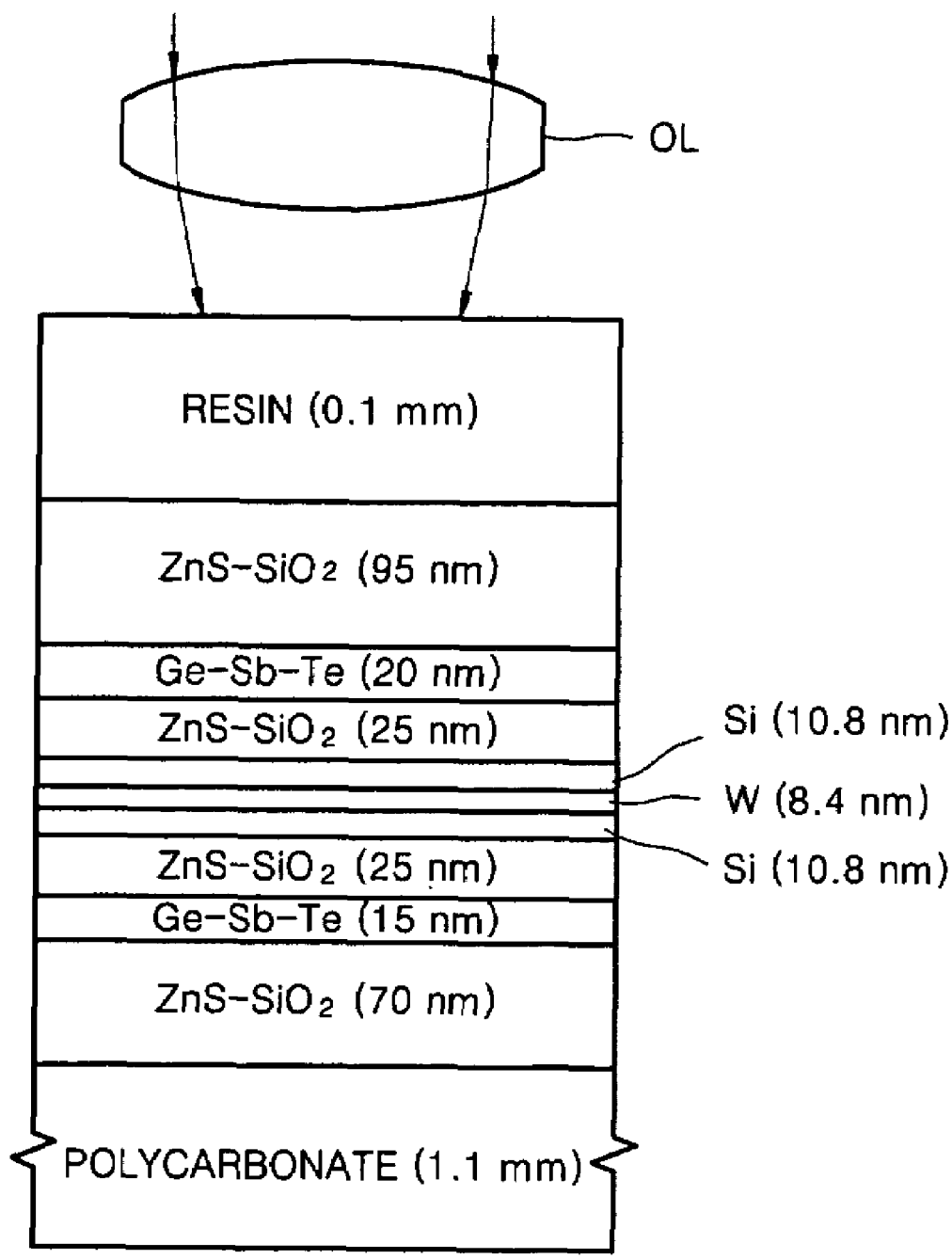
FIG. 11 is a cross-sectional view schematically showing a super resolution information storage medium according to another embodiment of the present invention.

The embodiment of FIG. 3, a two-layer structure has been just exemplified as the recording layer 37. However, in the case of using two or more materials as the recording layer 37, the recording layer 37 may have a multi-layer structure in which each material thin film is stacked or at least two materials are mixed with each other according to aspects of the invention. For example, as shown in FIG. 11, the recording layer 37 may have a three-layer structure in which Si, W, and Si are sequentially stacked.

Figure 4:
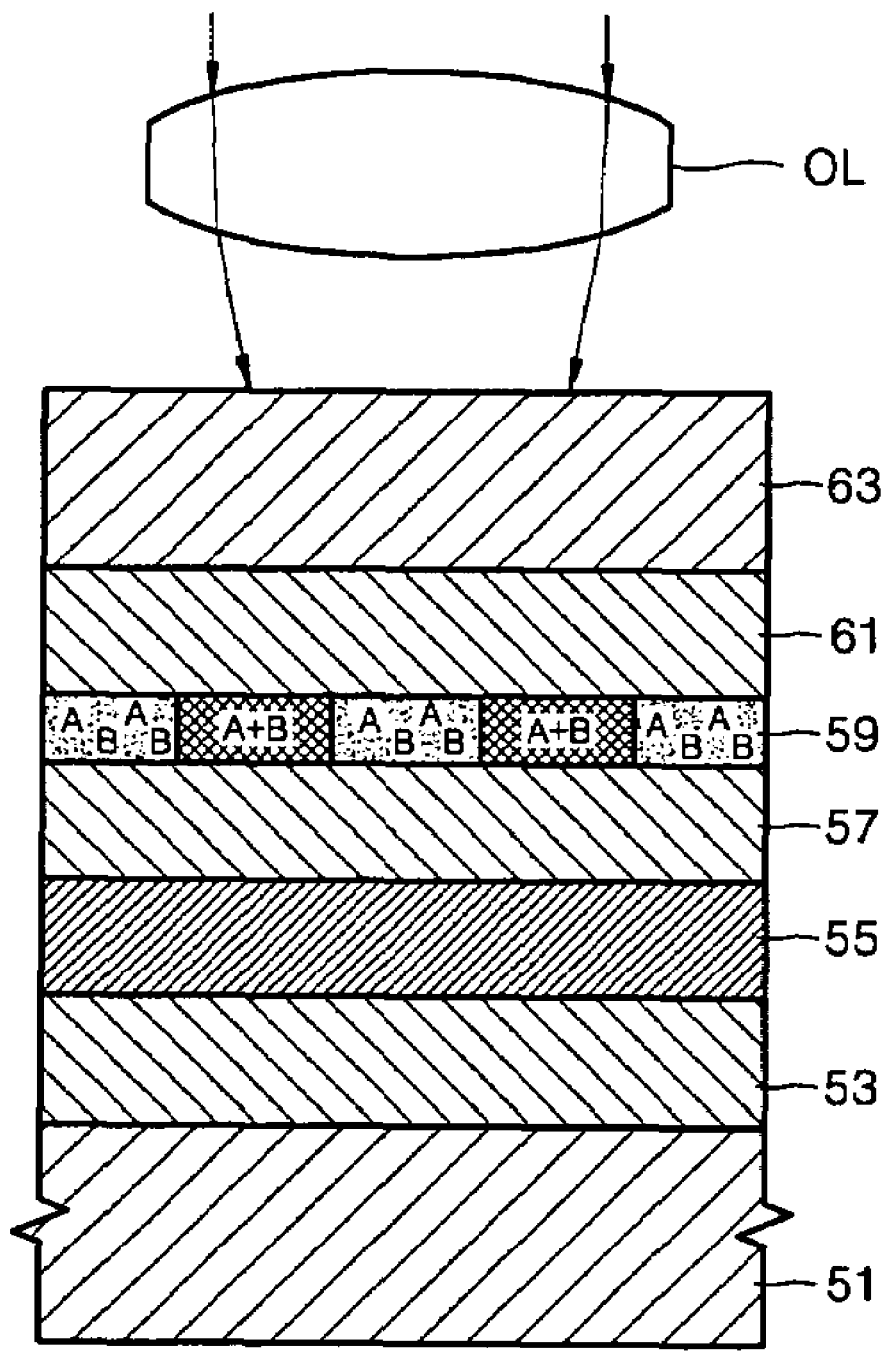
FIG. 4 is a cross-sectional view schematically showing an information storage medium according to an embodiment of the present invention.

Referring to FIG. 4, an information storage medium according to an embodiment of the present invention includes a substrate 51, a first dielectric layer 53, a super resolution reproduction layer 55, a second dielectric layer 57, a recording layer 59, a third dielectric layer 61, and a cover layer 45, which are sequentially formed on the substrate 51. The information storage medium shown in FIG. 4 differs from the information storage media shown in FIGS. 2 and 3 in that stack positions of the super resolution reproduction layer 55 and the recording layer 59 are different with respect to each other. Here, the substrate 51, the first through third dielectric layers 53, 57, and 61, and the cover, layer 63 substantially have the same structure and arrangement as the elements having the same names according to the embodiment shown in FIG. 2, and thus, detailed descriptions thereof will be omitted.

The recording layer 59 has the same structure as that of the recording layer 35 shown in FIG. 2 or the recording layer 37 shown in FIG. 3. In other words, the recording layer 59 includes two or more materials A, B mixed in a single layer or separately disposed on multiple layers. The materials A, B are heated by a predetermined write power, chemically react with each other, and thus, form the recording mark.

The super resolution reproduction layer 55 is made of a phase variation material having a property in which optical characteristics of a partial area of a spot of the incident beam are changed. That is, the super resolution reproduction layer 55 may comprise a Chalcogenide phase variation material, for example, a Ge—Sb—Te phase variation material or an Ag—In—Sb—Te phase variation material. Thus, when a reproduction beam focused by the objective lens OL is irradiated from an outside of the cover layer 63, the reproduction beam is transmitted into the recording layer 59 and forms a beam spot on the super resolution reproduction layer 55. Here, the beam incident on the super resolution reproduction layer 55 is reflected from a reflective layer formed on the substrate 51 and progresses in a direction of the recording layer 59. In this case, due to material characteristics of the super resolution reproduction layer 55, optical characteristics of a super resolution area formed as described above are different from optical characteristics in other areas. Thus, information may be reproduced on the recording mark formed on the recording layer 59 by the beam having optical reflection characteristics, in particular, on the recording mark having a size smaller than a size due to a resolving power.

Figure 5:
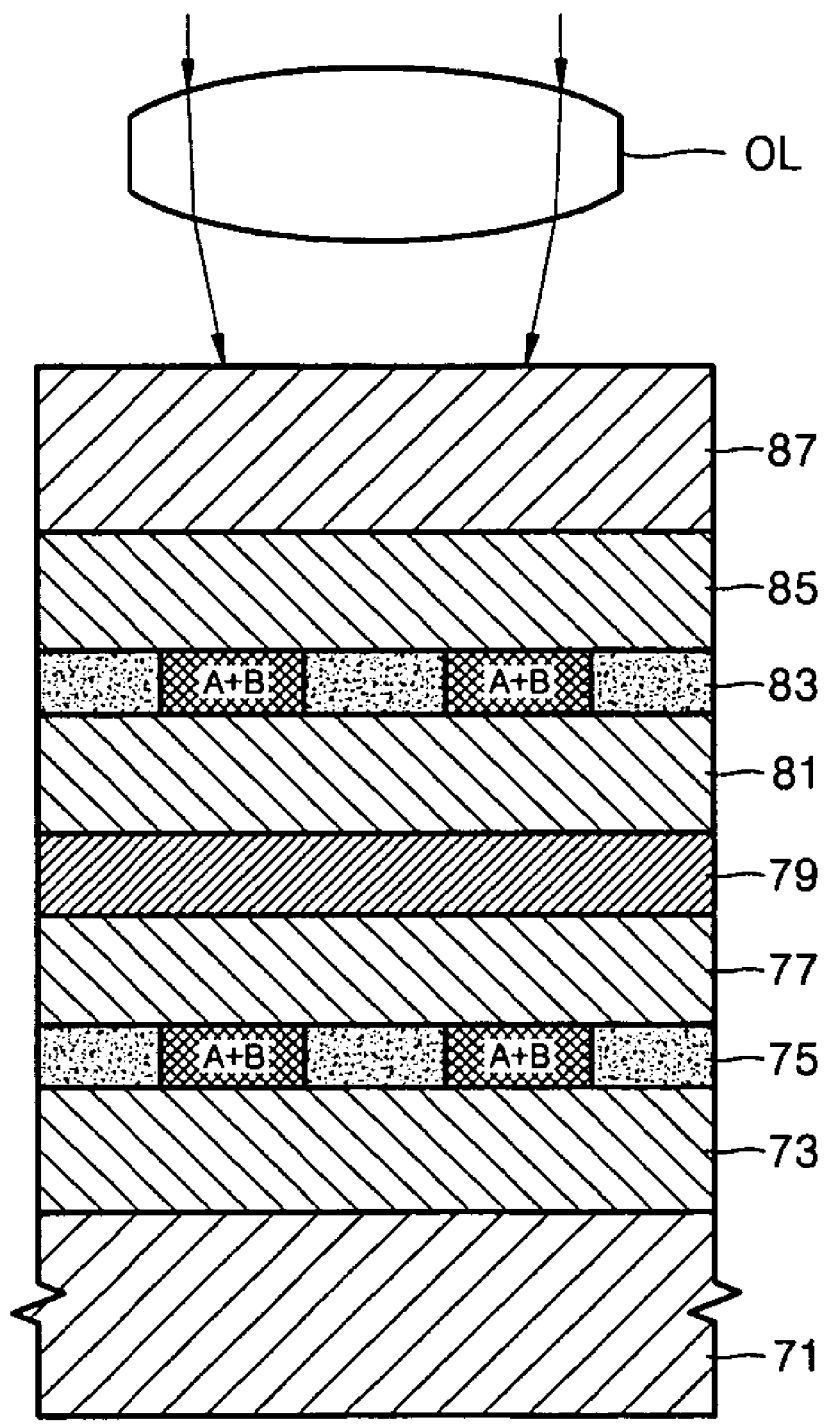
FIG. 5 is a cross-sectional view schematically showing an information storage medium according to an embodiment of the present invention.

Referring to FIG. 5, an information storage medium according to an embodiment of the present invention includes a substrate 71, a first dielectric layer 73, a first recording layer 75, a second dielectric layer 77, a super resolution reproduction layer 79, a third dielectric layer 81, a second recording layer 83, a fourth dielectric layer 85, and a cover layer 87, which are sequentially formed on the substrate 71. Here, the substrate 71, the first through fourth dielectric layers 73, 77, 81, and 85, and the cover layer 87 substantially have the same structure and arrangement as those of the elements having the same or substantially the same names according to the above embodiments shown in FIGS. 2 through 4, and thus, detailed descriptions thereof will be omitted.

The information storage medium of FIG. 5 is different from the information storage media shown in FIGS. 2 and 3 in that the recording layer has a two-layer structure, (that is, the first and second recording layers 75 and 83) that are different. Here, each of the first and second recording layers 75 and 83 has the same structure as that of the recording layer 35 of FIG. 2 or the recording layer 37 of FIG. 3. In this way, in the case of the information storage medium having a two-layer structure, as shown in FIG. 5, information may be recorded and reproduced using the same method as the information recording/reproducing principle of the information storage medium according to the embodiments of the present invention shown in FIGS. 2 and 3.

Figure 6:
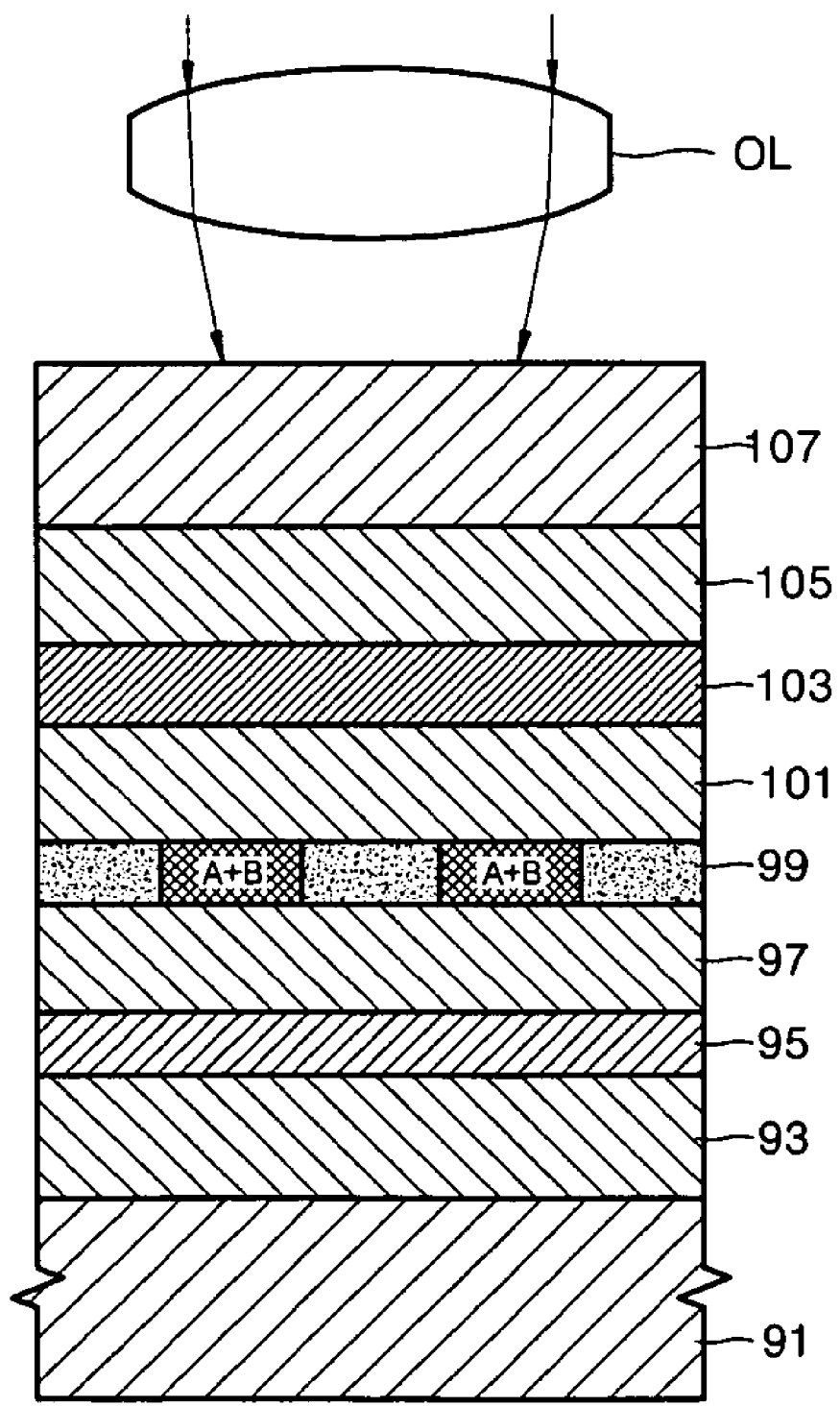
FIG. 6 is a cross-sectional view schematically showing an information storage medium according to an embodiment of the present invention.

Referring to FIG. 6, an information storage medium according to an embodiment of the present invention includes a substrate 91 having a surface on which a reflective layer (not separately shown) is formed, a first dielectric layer 93, a first super resolution reproduction layer 95, a second dielectric layer 97, a recording layer 99, a third dielectric layer 101, a second super resolution reproduction layer 103, a fourth dielectric layer 105, and a cover layer 107, which are sequentially formed on the substrate 91. Here, the substrate 91, the first through fourth dielectric layers 93, 97, 101, and 105, the recording layer 99, and the cover layer 107 substantially have the same structure and arrangement as the elements having the same or substantially the same names according to the above embodiments, shown in FIGS. 2 through 5, and thus, detailed descriptions thereof will be omitted.

The information storage medium of FIG. 6 is different from the information storage medium according to the embodiment shown in FIG. 2 in that a super resolution reproduction layer has a two-layer structure (that is, the first and second super resolution reproduction layers 95 and 103) which are different. Here, each of the first and second super resolution reproduction layers 95 and 103 has the same structure as that of the super resolution reproduction layer 41 of FIG. 2. In this way, in the case of the information storage medium having the two-layer structure, when information is reproduced on the recording mark recorded on the recording layer 99, in particular, on the recording mark having the size that is smaller than a size formed by a resolving power, changes in optical characteristics in a super resolution area of each of the first and second super resolution reproduction layers 95 and 103 are used such that a signal having a better quality compared to the information storage medium having a single layer structure may be detected.

Hereinafter, low frequency noise characteristics when a recording layer of an information storage medium according to the embodiment of the present invention, in particular, according to the embodiment of FIG. 6, is made of a W+Si mixed layer and a comparison example will be described.

Figure 7:
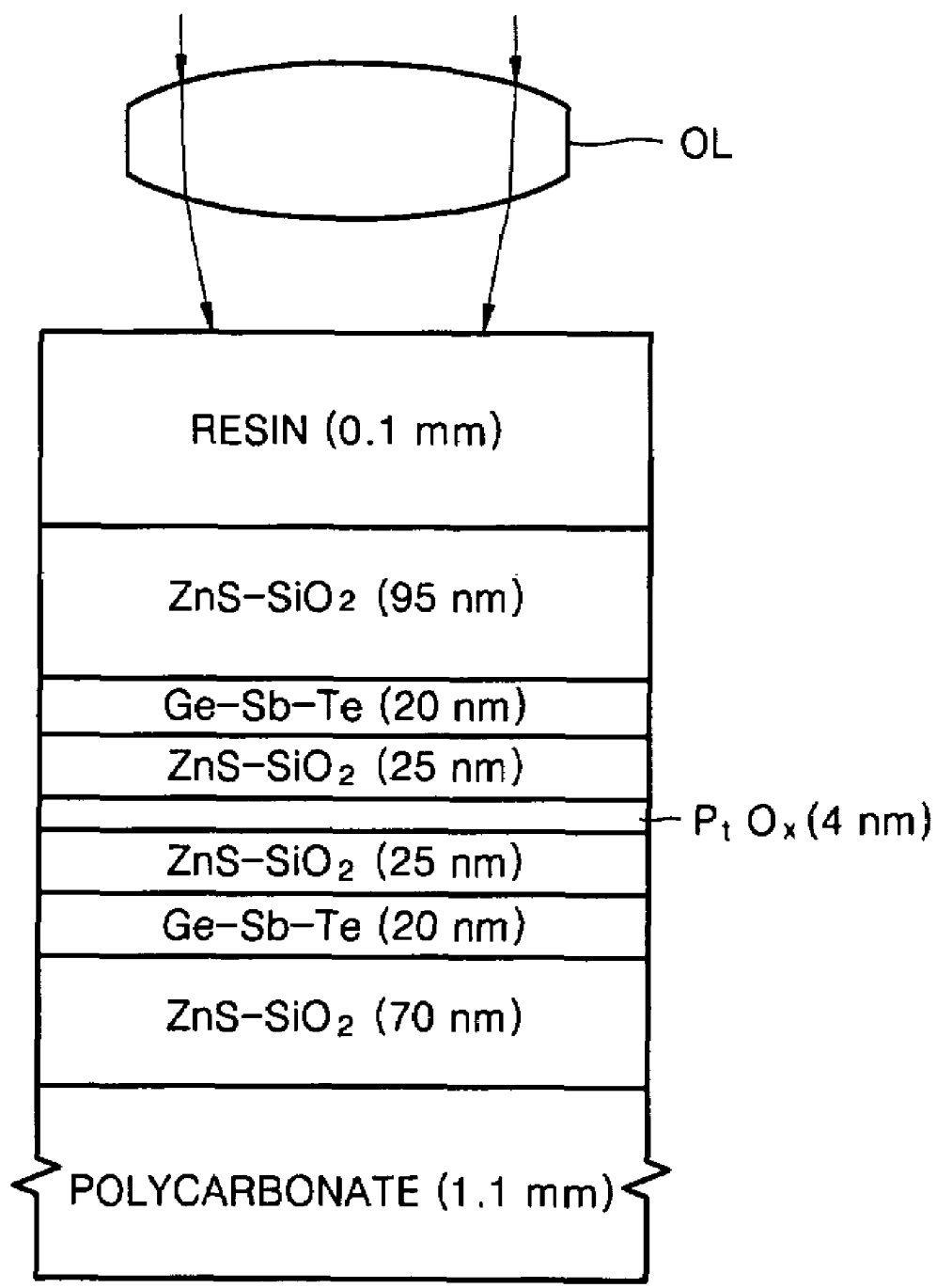
FIG. 7 is a cross-sectional view schematically showing an information storage medium according to a comparison example.

Referring to FIG. 7, a super resolution information storage medium according to a comparison example includes a substrate made of polycarbonate having a track pitch of 0.32

μm and a thickness of 1.1 mm, a dielectric layer made of ZnS—SiO$_2$ having a thickness of 70 nm, a phase variation layer made of Ge—Sb—Te having a thickness of 20 nm, a dielectric layer made of ZnS—SiO$_2$ having a thickness of 25 nm, a metallic oxide layer made of PtO$_x$ having a thickness of 4 nm (wherein x is a positive number), a dielectric layer made of ZnS—SiO$_2$ having a thickness of 25 nm, a phase variation layer made of Ge—Sb—Te having a thickness of 20 nm, and a dielectric layer made of ZnS—SiO$_2$ having a thickness of 95 nm, which are sequentially formed on the substrate by sputtering. Here, a cover layer made of resin having a thickness of 0.1 mm is formed on the upper dielectric layer by spin coating. The super resolution information storage medium having the above structure performs information reproduction by radiating a laser beam through the cover layer.

Figure 8:
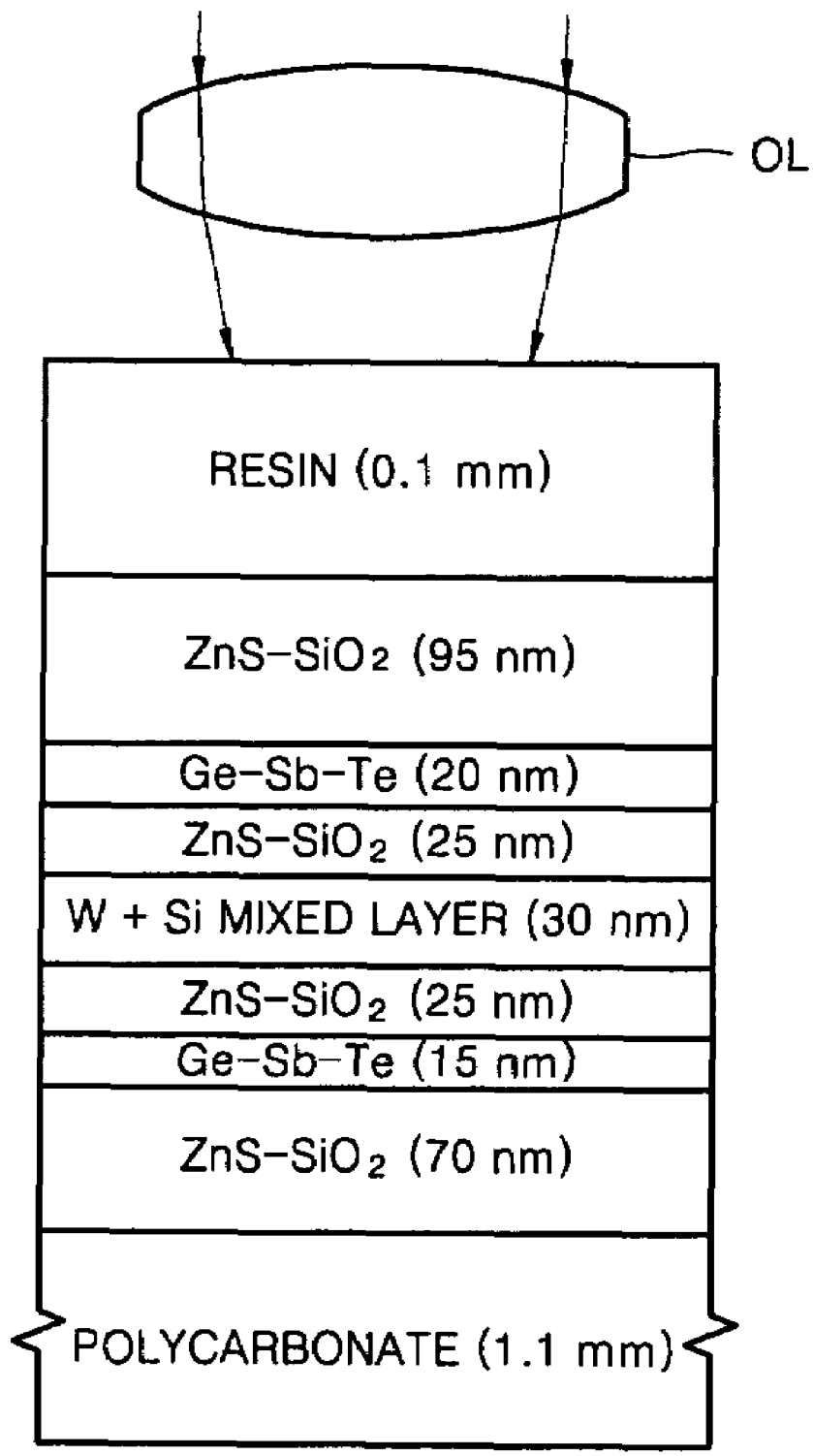
FIG. 8 is a cross-sectional view schematically showing an information storage medium according to an embodiment of the present invention.

Meanwhile, referring to FIG. 8, a super resolution information storage medium according to an embodiment includes a substrate made of polycarbonate having a track pitch of 0.32 μm and a thickness of 1.1 mm, a first dielectric layer made of ZnS—SiO$_2$ having a thickness of 70 nm, a first super resolution reproduction layer made of Ge—Sb—Te having a thickness of 15 nm, a second dielectric layer made of ZnS—SiO$_2$ having a thickness of 25 nm, a recording layer which is a W+Si mixed layer having a thickness of 30 nm, a third dielectric layer made of ZnS—SiO$_2$ having a thickness of 25 nm, a second super resolution reproduction layer made of Ge—Sb—Te having a thickness of 20 nm, and a fourth dielectric layer made of ZnS—SiO$_2$ having a thickness of 95 nm, which are sequentially formed on the substrate by sputtering. A cover layer made of resin having a thickness of 0.1 mm is formed on the fourth dielectric layer by spin coating.

The super resolution information storage medium having the above structure shown in FIG. 8 performs information reproduction by radiating a laser beam through the cover layer.

In both the comparison example of FIG. 7 and the embodiment of FIG. 8 having the above structures, the Ge—Sb—Te layer has the atom number ratio of Ge:Sb:Te=6.5:72.5:21.0, and the ZnS—SiO$_2$ layer has the atom number ratio of ZnS:SiO$_2$=80:20.

As described above, during information recording and reproducing on the information storage medium of FIG. 7 according to the comparison example and the embodiment of FIG. 8, a light source for radiating light having the wavelength λ of 405 nm and an optical pickup system comprising an objective lens having NA of 0.85 and having a resolving power λ/4NA at the wavelength of 119 nm are used.

Figure 9:
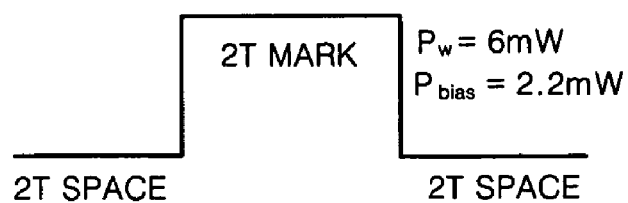
FIG. 9 shows a write waveform of a mark (2T mark) having the size of 75 nm less than a resolving power.

FIG. 9 shows a waveform of a mark (2T mark) having the size of 75 nm less than the size of formed by a resolving power recorded using the above-described recording method. In this case, a rotation linear velocity of the information storage medium is 5 m/sec, and a reference clock frequency is 133 MHz. In addition, a write power P$_w$ is 6 mW, and a bias power P$_{bias}$ is 2.2 mW.

Figure 10:
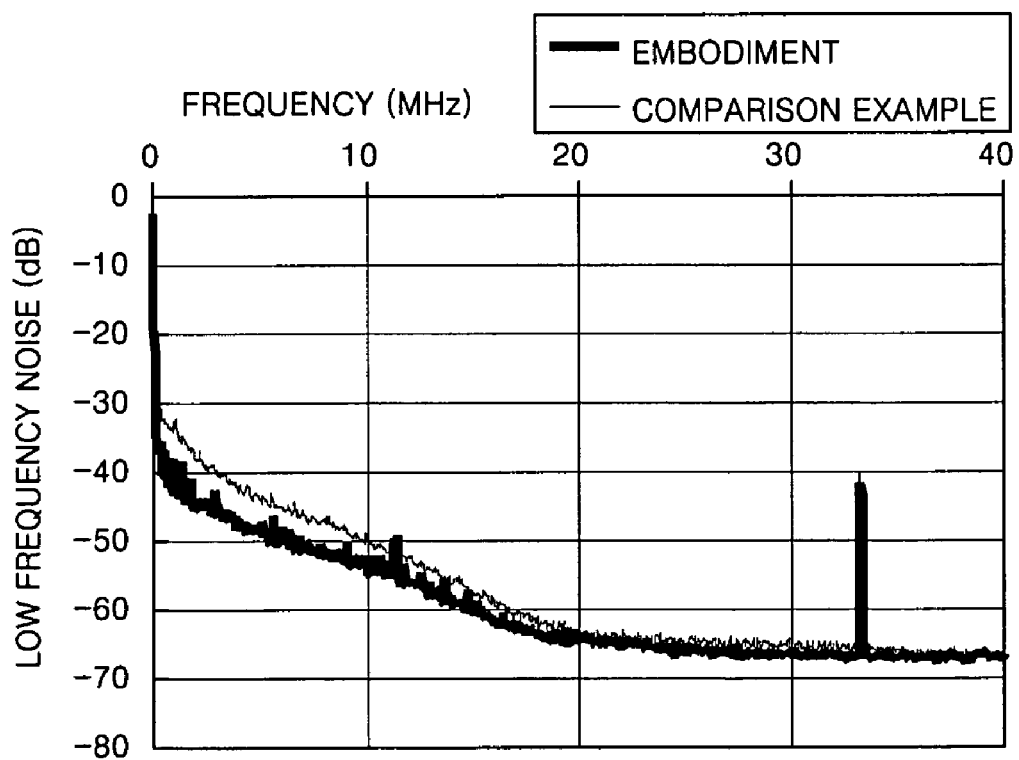
FIG. 10 is a graph of a frequency versus low frequency noise after the write waveform shown in FIG. 9 is written on the information storage media of FIGS. 7 and 8.

FIG. 10 is a graph of a frequency versus low frequency noise after the write waveform shown in FIG. 9 is written on the information storage media of FIGS. 7 and 8.

In both an embodiment and a comparison example, at a frequency of 33 MHz, a peak signal is generated so that super resolution reproduction is performed. Meanwhile, at a low frequency that is less than 5 MHz, low frequency noise in the information storage medium according to the embodiment is about 5 to 10 dB lower than low frequency noise in the information storage medium according to the comparison example. Thus, compared to the super resolution information storage medium using a metallic oxide layer as a recording layer, a reaction type recording layer according to the embodiment is advantageous in regards to a reduction in low frequency noise.

Meanwhile, in the case of a recording layer having a three-layer structure in which a Si layer, a W layer, and a Si layer are sequentially formed, instead of the super resolution information storage medium of FIG. 8, an effect corresponding to a reduction in low frequency noise may be achieved. In other words, as shown in FIG. 11, a super resolution information storage medium according to another embodiment includes a substrate made of polycarbonate having a track pitch of 0.32 μm and a thickness of 1.1 mm, a first dielectric layer made of ZnS—SiO$_2$ having a thickness of 70 nm, a first super resolution reproduction layer made of Ge—Sb—Te having a thickness of 15 nm, a second dielectric layer made of ZnS—SiO$_2$ having a thickness of 25 nm, a recording layer having a three-layer structure having a total thickness of 30 nm, a third dielectric layer made of ZnS—SiO$_2$ having a thickness of 25 nm, a second super resolution reproduction layer made of Ge—Sb—Te having a thickness of 20 nm, and a fourth dielectric layer made of ZnS—SiO$_2$ having a thickness of 95 nm, which are sequentially formed on the substrate by sputtering. Here, a cover layer made of resin having a thickness of 0.1 mm is formed on the fourth dielectric layer by spin coating. The recording layer having the three-layer structure is formed by sequentially stacking silicon (Si) having a thickness of 10.8 nm, tungsten (W) having a thickness of 8.4 nm, and silicon (Si) having a thickness of 10.8 nm on the third dielectric layer. In this case, in low frequency noise versus signal characteristics in the above-described manner, a signal level is higher than that of the information storage medium of FIG. 8. Thus, as described above, an effect corresponding to a reduction in low frequency noise may be achieved.

Figure 12:
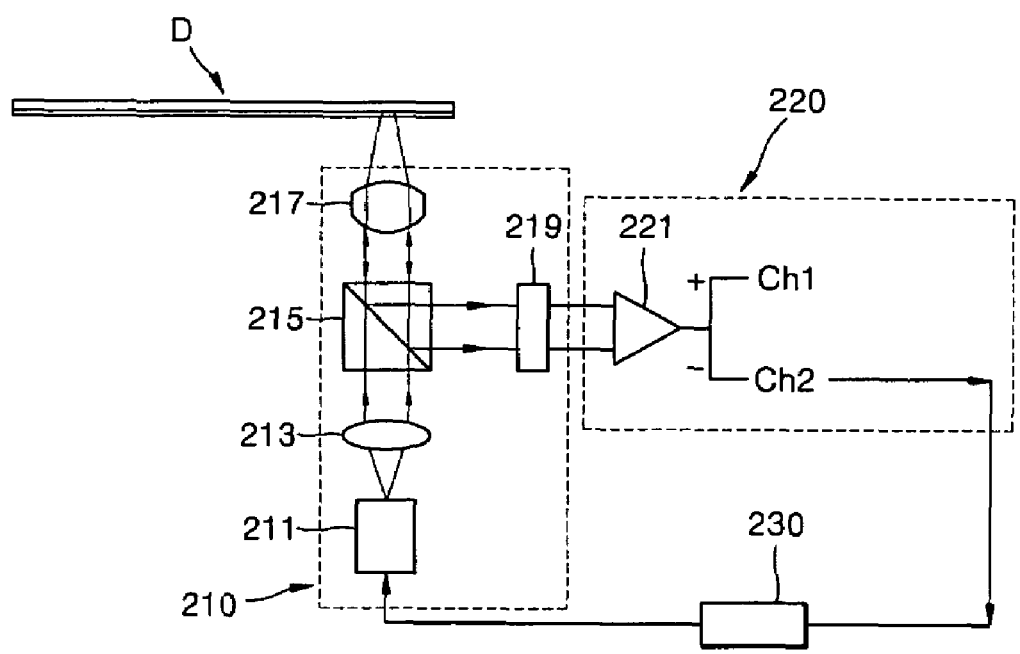
FIG. 12 schematically shows an apparatus for recording/reproducing information according to an embodiment of the present invention.

Referring to FIG. 12, an apparatus to record/reproduce information according to an embodiment of the present invention includes a pickup unit 210, a signal processor 220, and a controller 230. Information recording and/or reproducing is performed on the information storage medium D having one structure selected from the structures of FIGS. 2 through 6, 8 and 11.

The pickup unit 210 comprises a light source 211 to radiate a beam, an objective lens 217 to focus the incident beam and form a beam spot on an information storage medium D, and a photodetector 219 to receive the beam reflected from the information storage medium D. In addition, the pickup unit 210 comprises a collimating lens 213 to collimate the incident beam and a beam splitter 215 to change a progress path of the incident beam. The signal processor 220 calculates an information signal and an error signal from a signal, which is detected by the photodetector 219 and photoelectrically transformed. In other words, the signal photoelectrically transformed and output from the photodetector 219 is converted into an electrical signal via an operational circuit 221 and is output as a first channel Ch1 detected as a RF signal, that is, a sum signal, and a differential signal channel Ch2 for detecting a push-pull signal. Among these signals, the RF signal is used as a reproduction signal, and the differential signal is used in compensating tracking and focusing errors of the objective lens 217. The controller 230 controls a beam power output from the light source 210 from the signal detected by the signal processor 220 and driving the objective lens 217.

As described above, in the information storage medium according to an aspect of the present invention, a recording mark having a rectangular cross-section shape or a shape similar to the rectangular cross-section shape may be formed using a chemical reaction between two or more materials of a recording layer. Thus, the nonuniformity of the size of the recording mark is reduced such that a signal level becomes uniform and low frequency noise may be reduced. Accordingly, effective jitter characteristics may be obtained.

In addition, the apparatus to record/reproduce information according to an aspect of the present invention performs information recording/reproducing on the information storage medium having the above structure such that effective jitter characteristics are obtained.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An information storage medium for use in forming a recording mark having a size smaller than a size due to a resolving power of a beam incident from an apparatus to record/reproduce information with respect to the information storage medium, the medium comprising:
    a substrate;
    a recording layer formed on the substrate and comprising at least two materials in which the materials chemically react with each other due to an incident beam having a write power to form the recording mark; and
    a super resolution reproduction layer formed on and/or between the recording layer and the substrate and which has a property in which optical characteristics of a partial area, on which the incident beam is illuminated, are changed.

2. The information storage medium of claim 1, further comprising a dielectric layer having a structure with at least one layer to control optical and/or thermal characteristics on the substrate.

3. The information storage medium of claim 2, wherein the dielectric layer comprises one material selected from the group consisting of an oxide, a nitride, a carbide, a sulfide, and a fluoride.

4. The information storage medium of claim 3, wherein the dielectric layer comprises at least one material selected from the group consisting of $SiO_x$, $MgO_x$, $AlO_x$, $TiO_x$, $VO_x$, $CrO_x$, $NiO_x$, $ZrO_x$, $GeO_x$, $ZnO_x$, $SiN_x$, $AlN_x$, $TiN_x$, $ZrN_x$, $GeN_x$, SiC, ZnS, $ZnS—SiO_2$, and $MgF_2$, wherein x is a positive number.

5. The information storage medium of claim 1, wherein the recording layer has a one layer structure in which at least two materials are mixed with each other.

6. The information storage medium of claim 1, wherein the recording layer has a structure in which a portion of the at least two materials is disposed on one layer and the other portions thereof are disposed on and/or under the one layer.

7. The information storage medium of claim 1, wherein the recording layer includes at least two materials selected from the group consisting of Si, V, Cr, Co, Ni, Cu, Ge, Se, Nb, Mo, Ag, Sn, Sb, Te, Ti, Zr, W, and lanthanide (Ln), and the selected materials are mixed with each other in a one layer structure or are formed in a two-layer structure having a corresponding one of the elected materials.

8. The information storage medium of claim 1, wherein the recording layer includes a silicon (Si) material layer, a tungsten (W) material layer, and a Si material layer, which are sequentially stacked.

9. The information storage medium of claim 1, wherein the super resolution reproduction layer is made of a Chalcogenide phase variation material including at least one material selected from the group consisting of S, Se, and Te.

10. The information storage medium of claim 9, wherein the super resolution reproduction layer is a Chalcogenide phase variation material selected from the group consisting of Se—S, Se—Te, S—Te, P—S, P—Te, P—Se, As—S, As—Se, As—Te, Sb—S, Sb—Se, Sb—Te, Si—S, Si—Se, Si—Te, Ge—S, Ge—Se, Ge—Te, Sn—S, Sn—Se, Sn—Te, Ag—S, Ag—Se, Ag—Te, Al—S, Al—Se, Al—Te, Ga—S, Ga—Se, Ga—Te, In—S, In—Se, and In—Te, or is at least one compound selected from compounds formed by adding one or more other elements to the Chalcogenide phase variation materials.

11. The information storage medium of claim 9, wherein the super resolution reproduction layer includes a Sb—Te Chalcogenide phase variation material and a compound comprising at least one element selected from the group consisting of Ge, Ag, In, Sb, and Ga.

12. The information storage medium of claim 9, wherein the super resolution reproduction layer includes a Ge—Sb—Te phase variation material or an Ag—In—Sb—Te phase variation material.

13. The information storage medium of claim 1, wherein at least one surface of the substrate is reflectively coated so that an incident beam is reflected.

14. An information storage medium for use in forming a recording mark having a size smaller than a size formed by a resolving power of a beam incident from an apparatus to record/reproduce information with respect to the information storage medium, the medium comprising:
    a substrate;
    a super resolution reproduction layer formed on the substrate and having a property in which optical characteristics of a partial area of a spot on which the beam is incident are changed; and
    a recording layer formed on and/or between the super resolution reproduction layer and the substrate and which comprises at least two materials in which the materials chemically react with each other due to the incident beam having a write power to form the recording mark.

15. The information storage medium of claim 14, further comprising a dielectric layer having a structure with at least one layer to control optical and/or thermal characteristics on the substrate.

16. The information storage medium of claim 15, wherein the dielectric layer comprises one material selected from the group consisting of an oxide, a nitride, a carbide, a sulfide, and a fluoride.

17. The information storage medium of claim 16, wherein the dielectric layer comprises at least one material selected from the group consisting of $SiO_x$, $MgO_x$, $AlO_x$, $TiO_x$, $VO_x$, $CrO_x$, $NiO_x$, $ZrO_x$, $GeO_x$, $ZnO_x$, $SiN_x$, $AlN_x$, $TiN_x$, $ZrN_x$, $GeN_x$, SiC, ZnS, $ZnS—SiO_2$, and $MgF_2$, wherein x is a positive number.

18. The information storage medium of claim 14, wherein the recording layer has a one layer structure in which at least two materials are mixed with each other.

19. The information storage medium of claim 14, wherein the recording layer has a structure in which a portion of the at least two materials is disposed on one layer and the other portions thereof are disposed on and/or under the one layer.

20. The information storage medium of claim 14, wherein the recording layer includes at least two materials selected from the group consisting of Si, V, Cr, Co, Ni, Cu, Ge, Se, Nb, Mo, Ag, Sn, Sb, Te, Ti, Zr, W, and lanthanide (Ln) and the selected materials are mixed with each other in a one layer structure or are formed in a two-layer structure.

21. The information storage medium of claim 14, wherein the recording layer includes a silicon (Si) material layer, a tungsten (W) material layer, and a Si material layer, which are sequentially stacked.

22. The information storage medium of claim 14, wherein the super resolution reproduction layer comprises a Chalcogenide phase variation material including at least one material selected from the group consisting of S, Se, and Te.

23. The information storage medium of claim 22, wherein the super resolution reproduction layer is a Chalcogenide phase variation material selected from the group consisting of Se—S, Se—Te, S—Te, P—S, P—Te, P—Se, As—S, As—Se, As—Te, Sb—S, Sb—Se, Sb—Te, Si—S, Si—Se, Si—Te, Ge—S, Ge—Se, Ge—Te, Sn—S, Sn—Se, Sn—Te, Ag—S, Ag—Se, Ag—Te, Al—S, Al—Se, Al—Te, Ga—S, Ga—Se, Ga—Te, In—S, In—Se, and In—Te, or is at least one compound selected from compounds formed by adding one or more other elements to the Chalcogenide phase variation materials.

24. The information storage medium of claim 22, wherein the super resolution reproduction layer includes a Sb—Te Chalcogenide phase variation material and a compound comprising at least one element selected from the group consisting of Ge, Ag, In, Sb, and Ga.

25. The information storage medium of claim 22, wherein the super resolution reproduction layer includes a Ge—Sb—Te phase variation material or an Ag—In—Sb—Te phase variation material.

26. The information storage medium of claim 14, wherein at least one surface of the substrate is reflectively coated so that an incident beam is reflected.

27. An information storage medium for use in forming a recording mark having a size smaller than a size formed by a resolving power of an incident beam from an apparatus to record/reproduce information with respect to the information storage medium, the medium comprising:
 a substrate;
 a first dielectric layer formed on the substrate;
 a super resolution reproduction layer formed on the first dielectric layer and having a property in which optical characteristics of a partial area of a spot, on which the incident beam is illuminated, are changed;
 a second dielectric layer formed on the super resolution reproduction layer;
 a recording layer formed on the second dielectric layer and comprising at least two materials in which the materials chemically react with each other due to the incident beam having a write power to form the recording mark;
 a third dielectric layer formed on the recording layer; and
 a cover layer through which the incident beam is transmitted and which is formed on the third dielectric layer.

28. The information storage medium of claim 27, wherein each of the first through third dielectric layers comprises one material selected from the group consisting of an oxide, a nitride, a carbide, a sulfide, and a fluoride.

29. The information storage medium of claim 28, wherein each of the first through third dielectric layers comprises at least one material selected from the group consisting of $SiO_x$, $MgO_x$, $AlO_x$, $TiO_x$, $VO_x$, $CrO_x$, $NiO_x$, $ZrO_x$, $GeO_x$, $ZnO_x$, $SiN_x$, $AlN_x$, $TiN_x$, $ZrN_x$, $GeN_x$, SiC, ZnS, ZnS—$SiO_2$, and $MgF_2$, wherein x is a positive number.

30. The information storage medium of claim 27, wherein the recording layer has a one layer structure in which at least two materials are mixed with each other.

31. The information storage medium of claim 27, wherein the recording layer has a structure in which a portion of the at least two materials is disposed on one layer and the other portions thereof are disposed on and/or under the one layer.

32. The information storage medium of claim 27, wherein the recording layer includes at least two materials selected from the group consisting of Si, V, Cr, Co, Ni, Cu, Ge, Se, Nb, Mo, Ag, Sn, Sb, Te, Ti, Zr, W, and lanthanide (Ln) and the selected materials are mixed with each other in a one layer structure or are formed in a two-layer structure.

33. The information storage medium of claim 27, wherein the recording layer includes a silicon (Si) material layer, a tungsten (W) material layer, and a Si material layer, which are sequentially stacked.

34. The information storage medium of claim 27, wherein the super resolution reproduction layer comprises a Chalcogenide phase variation material including at least one material selected from the group consisting of S, Se, and Te.

35. The information storage medium of claim 34, wherein the super resolution reproduction layer is a Chalcogenide phase variation material selected from the group consisting of Se—S, Se—Te, S—Te, P—S, P—Te, P—Se, As—S, As—Se, As—Te, Sb—S, Sb—Se, Sb—Te, Si—S, Si—Se, Si—Te, Ge—S, Ge—Se, Ge—Te, Sn—S, Sn—Se, Sn—Te, Ag—S, Ag—Se, Ag—Te, Al—S, Al—Se, Al—Te, Ga—S, Ga—Se, Ga—Te, In—S, In—Se, and In—Te, or is at least one compound selected from compounds formed by adding one or more other elements to the Chalcogenide phase variation materials.

36. The information storage medium of claim 34, wherein the super resolution reproduction layer includes a Sb—Te Chalcogenide phase variation material and a compound comprising at least one element selected from the group consisting of Ge, Ag, In, Sb, and Ga.

37. The information storage medium of claim 34, wherein the super resolution reproduction layer includes a Ge—Sb—Te phase variation material or an Ag—In—Sb—Te phase variation material.

38. The information storage medium of claim 27, wherein at least one surface of the substrate is reflectively coated so that the incident laser beam is reflected.

39. An information storage medium for use in forming a recording mark having a size that is smaller than a size formed by a resolving power of an incident beam from an apparatus to record/reproduce information with respect to the information storage medium, the medium comprising;
 a substrate;
 a first dielectric layer formed on the substrate;
 a recording layer formed on the first dielectric layer and comprising at least two materials in which the materials chemically react with each other due to the incident beam that has a write power, forming the recording mark;
 a second dielectric layer formed on the recording layer;
 a super resolution reproduction layer formed on the second dielectric layer and having a property in which optical characteristics of a partial area of a spot of the super resolution reproduction layer are changed due to the incident beam;
 a third dielectric layer formed on the super resolution reproduction layer; and
 a cover layer through which the incident beam is transmitted and which is formed on the third dielectric layer.

40. The information storage medium of claim 39, wherein each of the first through third dielectric layers comprises one material selected from the group consisting of an oxide, a nitride, a carbide, a sulfide, and a fluoride.

41. The information storage medium of claim 40, wherein each of the first through third dielectric layers comprises at least one material selected from the group consisting of $SiO_x$, $MgO_x$, $AlO_x$, $TiO_x$, $VO_x$, $CrO_x$, $NiO_x$, $ZrO_x$, $GeO_x$, $ZnO_x$, $SiN_x$, $AlN_x$, $TiN_x$, $ZrN_x$, $GeN_x$, SiC, ZnS, ZnS—$SiO_2$, and $MgF_2$, wherein x is a positive number.

42. The information storage medium of claim 39, wherein the recording layer has a one layer structure in which at least two materials are mixed with each other.

43. The information storage medium of claim 39, wherein the recording layer has a structure in which a portion of the at least two materials is disposed on one layer and the other portions thereof are disposed on and/or under the one layer.

44. The information storage medium of claim 39, wherein the recording layer includes at least two materials selected from the group consisting of Si, V, Cr, Co, Ni, Cu, Ge, Se, Nb, Mo, Ag, Sn, Sb, Te, Ti, Zr, W, and lanthanide (Ln), and the selected materials are mixed with each other in a one layer structure or are formed in a two-layer structure.

45. The information storage medium of claim 39, wherein the recording layer includes a silicon (Si) material layer, a tungsten (W) material layer, and a Si material layer, which are sequentially stacked.

46. The information storage medium of claim 39, wherein the super resolution reproduction layer comprises a Chalcogenide phase variation material including at least one material selected from the group consisting of S, Se, and Te.

47. The information storage medium of claim 46, wherein the super resolution reproduction layer is a Chalcogenide phase variation material selected from the group consisting of Se—S, Se—Te, S—Te, P—S, P—Te, P—Se, As—S, As—Se, As—Te, Sb—S, Sb—Se, Sb—Te, Si—S, Si—Se, Si—Te, Ge—S, Ge—Se, Ge—Te, Sn—S, Sn—Se, Sn—Te, Ag—S, Ag—Se, Ag—Te, Al—S, Al—Se, Al—Te, Ga—S, Ga—Se, Ga—Te, In—S, In—Se, and In—Te, or is at least one compound selected from compounds formed by adding one or more other elements to the Chalcogenide phase variation materials.

48. The information storage medium of claim 46, wherein the super resolution reproduction layer includes a Sb—Te Chalcogenide phase variation material and a compound comprising at least one element selected from the group consisting of Ge, Ag, In, Sb, and Ga.

49. The information storage medium of claim 46, wherein the super resolution reproduction layer includes a Ge—Sb—Te phase variation material or an Ag—In—Sb—Te phase variation material.

50. The information storage medium of claim 39, wherein at least one surface of the substrate is reflectively coated so that an incident beam is reflected.

51. An information storage medium for use in forming a recording mark having a size smaller than a size formed by a resolving power of an incident beam from an apparatus to record/reproduce information with respect to the information storage medium, the medium comprising:
a substrate;
a first dielectric layer formed on the substrate;
a first super resolution reproduction layer formed on the first dielectric layer and having a property in which optical characteristics of a partial area of a spot of the first super resolution reproduction layer are changed due to the incident beam;
a second dielectric layer formed on the first super resolution reproduction layer;
a recording layer formed on the second dielectric layer and comprising at least two materials in which the materials chemically react with each other due to the incident beam having a write power and form a recording mark;
a third dielectric layer formed on the recording layer;
a second super resolution reproduction layer formed on the third dielectric layer and having a property in which optical characteristics of a partial area of the spot due to the incident beam are changed;
a fourth dielectric layer formed on the second super resolution reproduction layer; and
a cover layer through which the incident beam is transmitted and which is formed on the fourth dielectric layer.

52. The information storage medium of claim 51, wherein each of the first through fourth dielectric layers comprises one material selected from the group consisting of an oxide, a nitride, a carbide, a sulfide, and a fluoride.

53. The information storage medium of claim 52, wherein each of the first through fourth dielectric layers comprises at least one material selected from the group consisting of $SiO_x$, $MgO_x$, $AlO_x$, $TiO_x$, $VO_x$, $CrO_x$, $NiO_x$, $ZrO_x$, $GeO_x$, $ZnO_x$, $SiN_x$, $AlN_x$, $TiN_x$, $ZrN_x$, $GeN_x$, SiC, ZnS, ZnS—$SiO_2$, and $MgF_2$, wherein x is a positive number.

54. The information storage medium of claim 51, wherein the recording layer has a one layer structure in which at least two materials are mixed with each other.

55. The information storage medium of claim 51, wherein the recording layer has a structure in which a portion of the at least two materials is disposed on one layer and the other portions thereof are disposed on and/or under the one layer.

56. The information storage medium of claim 51, wherein the recording layer includes at least two materials selected from the group consisting of Si, V, Cr, Co, Ni, Cu, Ge, Se, Nb, Mo, Ag, Sn, Sb, Te, Ti, Zr, W, and lanthanide (Ln), and the selected materials are mixed with each other in a one layer structure or are formed in a two-layer structure.

57. The information storage medium of claim 51, wherein the recording layer includes a silicon (Si) material layer, a tungsten (W) material layer, and a Si material layer, which are sequentially stacked.

58. The information storage medium of claim 51, wherein each of the first and second super resolution reproduction layers comprises a Chalcogenide phase variation material including at least one material selected from the group consisting of S, Se, and Te.

59. The information storage medium of claim 58, wherein each of the first and second super resolution reproduction layers is a Chalcogenide phase variation material selected from the group consisting of Se—S, Se—Te, S—Te, P—S, P—Te, P—Se, As—S, As—Se, As—Te, Sb—S, Sb—Se, Sb—Te, Si—S, Si—Se, Si—Te, Ge—S, Ge—Se, Ge—Te, Sn—S, Sn—Se, Sn—Te, Ag—S, Ag—Se, Ag—Te, Al—S, Al—Se, Al—Te, Ga—S, Ga—Se, Ga—Te, In—S, In—Se, and In—Te, or is at least one compound selected from compounds formed by adding one or more other elements to the Chalcogenide phase variation materials.

60. The information storage medium of claim 58, wherein each of the super resolution reproduction layers includes a Sb—Te Chalcogenide phase variation material and a compound comprising at least one element selected from the group consisting of Ge, Ag, In, Sb, and Ga.

61. The information storage medium of claim 58, wherein each of the first and second super resolution reproduction layers includes a Ge—Sb—Te phase variation material or an Ag—In—Sb—Te phase variation material.

62. The information storage medium of claim 51, wherein at least one surface of the substrate is reflectively coated so that an incident beam is reflected.

63. An information storage medium for use in forming a recording mark having a size that is smaller than a size formed by a resolving power of an incident beam from an apparatus to record/reproduce information on the information storage medium, the medium comprising:
a substrate;
a first dielectric layer formed on the substrate;
a first recording layer formed on the first dielectric layer and comprising at least two materials in which the materials chemically react with each other due to the incident beam thereon having a write power to form the recording mark;
a second dielectric layer formed on the first recording layer;
a super resolution reproduction layer formed on the second dielectric layer and having a property in which optical characteristics of a partial area of a spot of the super resolution reproduction layer is changed due to the incident beam;
a third dielectric layer formed on the super resolution reproduction layer;
a second recording layer formed on the third dielectric layer and comprising at least two materials in which the materials chemically react with each other due to the incident beam having a write power and form a recording mark;
a fourth dielectric layer formed on the second recording layer; and
a cover layer through which the incident beam is transmitted and which is formed on the fourth dielectric layer.

64. The information storage medium of claim 63, wherein each of the first through fourth dielectric layers comprises one material selected from the group consisting of an oxide, a nitride, a carbide, a sulfide, and a fluoride.

65. The information storage medium of claim 64, wherein each of the first through fourth dielectric layers comprises at least one material selected from the group consisting of $SiO_x$, $MgO_x$, $AlO_x$, $TiO_x$, $VO_x$, $CrO_x$, $NiO_x$, $ZrO_x$, $GeO_x$, ZnO, $SiN_x$, $AlN_x$, $TiN_x$, $ZrN_x$, $GeN_x$, SiC, ZnS, $ZnS-SiO_2$, and $MgF_2$, wherein x is a positive number.

66. The information storage medium of claim 63, wherein each of the first and second recording layers has a one layer structure in which at least two materials are mixed with each other.

67. The information storage medium of claim 63, wherein each of the first and second recording layers has a structure in which a portion of the at least two materials is disposed on one layer and the other portions thereof are disposed on and/or under the one layer.

68. The information storage medium of claim 63, wherein each of the first and second recording layers includes at least two materials selected from the group consisting of Si, V, Cr, Co, Ni, Cu, Ge, Se, Nb, Mo, Ag, Sn, Sb, Te, Ti, Zr, W, and lanthanide (Ln) and the selected materials are mixed with each other in a one layer structure or are formed in a two-layer structure.

69. The information storage medium of claim 63, wherein each of the first and second recording layers includes a silicon (Si) material layer, a tungsten (W) material layer, and a Si material layer, which are sequentially stacked.

70. The information storage medium of claim 63, wherein the super resolution reproduction layer comprises a Chalcogenide phase variation material including at least one material selected from the group consisting of S, Se, and Te.

71. The information storage medium of claim 70, wherein the super resolution reproduction layer is a Chalcogenide phase variation material selected from the group consisting of Se—S, Se—Te, S—Te, P—S, P—Te, P—Se, As—S, As—Se, As—Te, Sb—S, Sb—Se, Sb—Te, Si—S, Si—Se, Si—Te, Ge—S, Ge—Se, Ge—Te, Sn—S, Sn—Se, Sn—Te, Ag—S, Ag—Se, Ag—Te, Al—S, Al—Se, Al—Te, Ga—S, Ga—Se, Ga—Te, In—S, In—Se, and In—Te, or is at least one compound selected from compounds formed by adding one or more other elements to the Chalcogenide phase variation materials.

72. The information storage medium of claim 70, wherein the super resolution reproduction layer includes a Sb—Te Chalcogenide phase variation material and a compound comprising at least one element selected from the group consisting of Ge, Ag, In, Sb, and Ga.

73. The information storage medium of claim 70, wherein the super resolution reproduction layer includes a Ge—Sb—Te phase variation material or an Ag—In—Sb—Te phase variation material.

74. The information storage medium of claim 63, wherein at least one surface of the substrate is reflectively coated so that an incident beam is reflected.

* * * * *

UNITED STATES PATENT AND TRADEMARK OFFICE
CERTIFICATE OF CORRECTION

PATENT NO. : 7,368,157 B2 Page 1 of 1
APPLICATION NO. : 11/079321
DATED : May 6, 2008
INVENTOR(S) : In-oh Hwang et al.

It is certified that error appears in the above-identified patent and that said Letters Patent is hereby corrected as shown below:

Column 17, line 45, change "ZnO" to --$ZnO_x$--.

Signed and Sealed this

Eighth Day of July, 2008

JON W. DUDAS
*Director of the United States Patent and Trademark Office*